2,999,883
METHOD OF PRODUCING DIPHENYL SULPHONES
Cornelis Johannes Schoot, Eindhoven, and Johan Herman Van Rij, Weesp, Netherlands, assignors to North American Philips Company, Inc., New York, N.Y., a corporation of Delaware
No Drawing. Filed July 22, 1959, Ser. No. 828,735
Claims priority, application Netherlands July 25, 1958
12 Claims. (Cl. 260—607)

This invention relates to a method of producing halogen diphenyl sulphones by the reaction of a halogen substituted benzene and a halogen benzene sulphohalide in the presence of a condensation agent.

It is known that halogen diphenyl sulphones can be produced according to the so-called Friedel-Crafts reaction by reacting a halogen benzene sulphohalide and benzene or a benzene derivative in the presence of a condensation agent, for example aluminum chloride or ferric chloride. Such a method is shown for example in Kirk-Othmer, Encyclopedia of Chemical Technology, vol. XIII, p. 343.

The production of 2,4,5,4'-tetrachlorodiphenyl sulfone prepared according to this method by reacting 2,4,5-trichloro benzene sulphochloride and monochloro benzene is described in Dutch patent specification 81,359 (PH 12,519).

It has now been found that in this method the yield of the desired sulphone varies considerably.

The variations in the yield of the sulphone produced by this method appears to be due to the occurrence of a secondary reaction having autocatalytic character. In the case that aluminum chloride is used as a condensation agent probably in this secondary reaction practically only sulfinic acid is produced or the aluminum chloride complex thereof is produced and these substances are not further converted into the desired sulphone. This secondary reaction will hereinafter be referred to as the "sulphinic acid reaction."

It has also been found that this "sulphinic acid reaction" may occur to an extent such that substantially no sulfone is produced. This is the case, for example, when a mixture of equimolar amounts of 2,4,5-trichlorobenzene sulphochloride and aluminum chloride and a relatively large quantity of monochlorobenzene is stored at 15° to 20° C. for about 20 hours and subsequently heated to say, 100° C. It is assumed that in this event during storage at room temperature (15° to 20° C) a small amount of sulphinic acid is produced which at an elevated temperature accelerates the "sulphinic acid reaction" to an extent such that practically only the sulphinic acid is produced.

It has also been found that in general a poor yield of sulfone is obtained if the reaction mixture, containing all the reactants is stored for some time, for example one hour, at a temperature from 20° to 30° C. lower than the temperature at which a rapid reaction takes place, after which the mixture is heated to the reaction temperature. The same result is achieved if the reaction mixture is slowly heated from room temperature to the reaction temperature. The term "reaction temperature" as used herein is to be understood to mean the temperature at which the reaction is completed at least substantially within 20 minutes, that is to say, that the sulfo-halide is converted for at least 70% and preferably for at least 90% within this period. It will be appreciated that this temperature depends upon the reaction components used.

It is a principal object of our invention therefore to modify the method of producing halogen diphenyl sulphones by the condensation of a halogen benzene sulphohalide and benzene or a halogen substituted benzene so as to produce a uniformly high yield of the sulphone.

This and other objects of our invention will be apparent from the description that follows:

According to our invention we have found that the production of the sulphinic acid is minimized and that a satisfactory and reproducible yield of sulphone is obtainable if the reaction components, that is to say, a halogen benzene sulphohalide and benzene of which at least one hydrogen atom may be replaced by halogen atoms, and furthermore aluminum-chloride or ferric chloride as a condensation agent are mixed at the reaction temperature or one of the ingredients is kept out of contact with the others until a short time before the mixture is brought to the reaction temperature.

More particularly according to our invention the sulphohalide, the benzene or the halogen benzene and the aluminum chloride or ferric chloride condensation agents are mixed at the reaction temperature or one of the reagents is kept out of the mixture until a very short time before the mixture is brought to the reaction temperature, which reaction temperature is chosen so that the reaction is completed at least substantially within 20 minutes and preferably within 10 minutes.

The method in accordance with the invention can be carried out discontinuously. In this event, preferably the separate reaction components or a mixture of two of the reaction components and the third component are each separately brought to the reaction temperature before they are mixed, after which they are mixed at the reaction temperature. In order to obtain a satisfactory yield of sulphone, in this event, mixing must be performed rapidly. In the discontinuous method, the reaction components may alternatively be mixed together a short time (within about 10 minutes) before the resultant mixture is rapidly heated to the reaction temperature.

It has also been found that a particularly suitable form of the method in accordance with the invention is obtained if this method is carried out continuously and stoichiometric quantities of the reaction components are mixed together at the reaction temperature or a short time (within about 10 minutes) before the mixture is brought to the reaction temperature, and are continuously supplied to a reactor in which the mixture remains for a period of time such that the reaction has taken place at least substantially, after which the product is continuously discharged from the reactor.

The reaction components may be separately added or two of the components, preferably the halogen benzene sulphohalide and the aluminum chloride, can be mixed previously, and the third component being added in due time.

It has now been found that it is of importance for a practical performance of the method in accordance with the invention that the halogen benzene sulphohalide and the aluminum chloride only should be mixed at a temperature at which the formation of a complex compound of the sulphohalide and the aluminum chloride takes place, for it has been found that in this embodiment, in which the resultant complex compound mentioned is mixed with benzene or a halogen benzene, the reaction in accordance with the invention proceeds particularly smoothly and a satisfactory yield of sulphone is produced. At the temperature of the reaction in accordance with the invention, this complex compound is liquid and this provides the advantage that liquids can be used. This is highly important for a continuous large scale process.

In a preferred embodiment of the invention equimolar amounts of the halogen benzene sulphohalide and of aluminum chlorides, or a slight excess, for example a 10% excess, of the latter are used. In the case wherein ferric chloride is applied preferably an amount of 1.5–2.5 mol of this compound per mol of halogenobenzene sulphohalide is used. The benzene or the halogen benzene preferably are used in excess, for example in a 50 to 100% excess; the use of a larger excess has no disturbing effect but provides hardly any advantage.

It is of importance that the aluminum chloride is used as a fine powder. It has been found that, when aluminum chloride is used, the presence of about 1% by weight of ferric chloride improves the yield of the desired sulphone.

It has also been found that, if aluminum chloride is used as a condensation agent, a slight amount of water improves the yield of sulphone. For this purpose preferably from 0.5% to 3% by weight of water is used, calculated with respect to the aluminum chloride; if it is desired to use a greater amount of water, a greater amount of aluminum chloride must also be used. Preferably the water is added to the aluminum chloride or to the mixture of sulphohalide and aluminum chloride in a finely divided form. If the water is added drop by drop to a solution of aluminum-chloride in 2,4,5-trichlorobenzene sulphochloride, clots are formed by local reaction with aluminum-chloride. These clots do not dissolve so that the water is not distributed satisfactorily through the mixture.

A particularly suitable method of adding the water to the mixture of sulphohalide and aluminum chloride consists in passing a moist gas stream, for example a wet air stream, is passed through this mixture until a sufficient amount of water has been taken up. Alternatively, the water can be added by treating finely powdered solid aluminum chloride with a moist gas stream.

The method in accordance with the invention is particularly suited to the production of polychlorodiphenyl sulphones and especially of 2,4,5,4'-tetrachlorodiphenyl sulphone from 2,4,5-trichlorobenzene-sulphochloride and monochlorobenzene. In this case, and especially when using the continuous process, a particularly suitable embodiment is that in which the complex compound of 2,4,5-trichlorobenzene sulphochloride and aluminum-chloride is prepared separately by mixing the two substances at, from 100° to 110° C., since at this temperature a homogeneous liquid is produced.

Other halogenated sulphones that may be prepared according to the method of our invention are 2,4'-dichloro-diphenyl sulphone from orthochlorobenzene-sulphochloride and monochlorobenzene, 2,4,2',5'-tetrabromo diphenyl sulphochloride from 2,4-dibromobenzene and 2,5-dibromobenzene sulphochloride, 2,3,5,4'-tetrachloro-diphenyl sulphone from 2,3,5-trichlorobenzene-sulphochloride and parachloro-benzene and p-fluorodiphenyl sulphochloride from benzene and parafluoro-sulphochloride.

A reactor for carrying out the continuous method can be designed in a variety of forms. A suitable design is that in which a tubular reactor is chocsen. The reactor can be heated in a variety of manners. The tubular reactor may be arranged in a tubular furnace which may be heated by steam, Dowtherm or electrically. The components can be mixed in the usual manner, either mechanically or by the choice of suitable shapes of the supply members.

A suitable embodiment of the method in accordance with the invention furthermore is that in which benzene or the halogen benzene derivative and the mixture of sulphohalide and aluminum-chloride or ferric chloride are separately heated to the reaction temperature before their introduction into the reactor.

The higher the temperature at which the reaction takes place, the shorter can be the time of treatment in the reactor. For preparing 2,4,5,4'-tetrachlorodiphenyl sulphone from 2,4,5-trichlorobenzene sulphochloride and monochlorobenzene, the reaction temperature is chosen between, say, 100° C. and 160° C. and preferably between 105° C. and 130° C. At a reaction temperature of 115° C. a reaction time of about 10 minutes proved to be very suitable.

EXAMPLE I

*2,4,5,4'-tetrachlorodiphenyl sulphone*

100 gms. of aluminum chloride, which contained 1 gm. of ferric chloride, were dissolved at a temperature of between 100° C. and 110° C. in 140 gms. of 2,4,5-trichlorobenzene-sulphochloride. The resultant solution was slightly viscous at 100° C. Moist air was passed through the solution at about 75° C. until about 1 gm. of water had been absorbed.

The resultant solution and 110 gms. of monochlorobenzene were separately heated to a temperature of about 115° C. and thereupon separately and continuously supplied to a tubular reactor, which was heated to a temperature of about 115° C., at a speed such that they were in the reactor for about 10 minutes. Subsequently the mixture was discharged from the reactor continuously. During the reaction hydrochloric acid was produced. The reaction mixture is poured into cold water and the precipitate crystallized from ethanol. Yield 75% of 2,4,5,4'-tetrachlorodiphenyl sulphone. Melting point 145° C.

EXAMPLE II

*2,4,5,4'-tetrachlorodiphenyl sulphone*

In the manner described in Example I, 2,4,5,4'-tetrachlorodiphneyl-sulphone was produced at a reaction temperature of 130° C. the time of treatment in the reactor being about 5 minutes. Yield 77%. Melting point 145° C.

EXAMPLE III

*2,4,5-trichlorodiphenyl sulphone*

100 gms. of aluminum chloride, which contained about 1 gm. of ferric chloride, were dissolved in 140 gms. of 2,4,5-trichlorobenzene-sulphochloride at a temperature between 100° C. and 110° C. Through the resultant solution, which was slightly viscous, moist air was passed at about 75° C. until about 1 gm. of water was absorbed by the solution. This solution and 90 gms. of benzene were separately heated to 75° C. and 70° C. respectively, and then likewise separately supplied to a tubular reactor, which was heated to about 80° C., at a speed such that the mixture was in the reactor for about 5 minutes, after which it was continuously discharged from the reactor. The excess benzene was removed from the reaction mixture by distillation with the aid of steam after which the distillation residue was filtered. The crude 2,4,5-trichlorodiphenyl-sulphone obtained was then crystallized from ethanol. Yield 143 gms. (77%). Melting point 127–128° C.

EXAMPLE IV

*4,4'-dichlorodiphenyl-sulphone*

100 gms. of aluminum-chloride containing about 1 gm. of ferric chloride were dissolved in 105 gms. of 4-chlorobenzene-sulphochloride at a temperature between 100° C. and 110° C. Through the resultant solution moist air was passed at 75° C. until about 1 gm. of water had been absorbed by the solution. This solution and 110 gms. of monochlorobenzene were separately heated to 115° C. and then, were separately supplied to a tubular reactor, which was heated to about 130° C., at a speed such that the mixture was about 5 minutes in the reactor, after which it was drawn off continuously. The reaction mixture was worked up in a manner similar to that described in Example III. After crystallization from ethanol 121 gms. of 4,4'-dichloro-diphenylsulphone (85%) were obtained. Melting point 146° C.–147° C.

EXAMPLE V

*2,5,4'-trichlorodiphenyl-sulphone*

In a manner similar to that described in Example IV a 75% yield of 2,5,4'-trichlorodiphenyl-sulphone was obtained from 2,5-dichlorobenzene-sulphochloride and monochlorobenzene. In this case the recrystallization was effected from benzene. The melting point of the resultant product was 154° C.–155° C.

While we have described our invention in connection with specific embodiments and applications, other modifications thereof will be readily apparent to those skilled in this art without deparitng from the spirit and scope of the invention as defined in the appended claims.

EXAMPLE VI

A mixture of 280 gms. of trichlorobenzene sulphochloride, 300 gms. of ferric chloride and 500 gms. of monochlorobenzene was heated to a temperature of 120° C. in the course of 15 minutes. The reaction mixture was kept at that temperature for another 15 minutes. Thereafter the reaction mixture was poured into diluted hydrochloric acid. The water layer and the solution of the reaction product in monochlorobenzene were separated; the latter was washed with water. The monochlorobenzene was distilled off and the residue crystallized from ethanol. Yield: 80% of 2,4,5,4'-tetrachlorodiphenylsulphone. Melting point: 145° C.

EXAMPLE VII

In a manner similar to that described in Example VI 2,4,5,4'-tetrachlorodiphenylsulphone was produced from 2,4,5-trichlorobenzenesulphochloride and monochlorobenzene in the presence of ferric chloride as a condensation agent whereby the reaction mixture was heated to reaction temperature (120° C.) in the course of 60 minutes. The reaction mixture was worked up in a manner similar to that of Example VI. Yield 56% of 2,4,5,4'-tetrachlorodiphenylsulphone. Melting point: 145° C.

What is claimed is:

1. In the method of producing nuclear halogenated diphenylsulfones by the Friedel-Crafts condensation, in the presence of a condensation agent selected from the group consisting of aluminum chloride and ferric chloride, of a nuclear halogenated benzene sulfohalide and an aromatic compound selected from the group consisting of benzene and nuclear halogenated benzenes the improvement which comprises heating said reagents almost to the reaction temperature while at least one of said reagents is out of contact with the remaining reagents and then mixing all of said preheated reagents together at the reaction temperature, said reaction temperature being such that the condensation is completed within 20 minutes and being between about 80° C. and 160° C.

2. In the method of producing 2,4,5,4'-tetrachlorodiphenylsulfone by the Friedel-Crafts condensation, in the presence of a condensation agent selected from the group consisting of aluminum chloride and ferric chloride, of 2,4,5-trichlorobenzene sulfohalide and monochlorobenzene the improvement which comprises heating said reagents almost to the reaction temperature while at least one of said reagents is out of contact with the remaining reagents and then mixing all of said preheated reagents together at the reaction temperature, said reaction temperature being such that the condensation is completed within 20 minutes and being between about 80° C. and 160° C.

3. The method of claim 2, in which 1.5–2.5 mols of ferric chloride per mol of the sulfohalide is employed.

4. The method of claim 1 in which 90% of the condensation is completed within 10 minutes.

5. The method of claim 1 in which the reagents in stoichiometric proportions are continuously supplied to a reactor in which the condensation is brought at least substantially to completion and from which reactor the resultant sulphone is continuously discharged.

6. The method of claim 5 in which a mixture of about equimolar quantities of the nuclear halogenated benzenesulphohalide and aluminum chloride is mixed with the aromatic compound.

7. The method of claim 5 in which a mixture of about equimolar quantities of the nuclear halogenated benzenesulphohalide and aluminum chloride is mixed with the aromatic compound, said aluminum chloride containing from 0.5 to 3% by weight of water.

8. The method of claim 5 in which equimolar quantities of aluminum chloride and the nuclear halogenated benzene sulphohalide are reacted to form a liquid complex compound and about 1% of water by weight is added to the liquid complex compound.

9. The method of claim 7 in which the water is added in the form of a moist gas stream.

10. The method of claim 9 in which the water is added in the form of a moist air stream.

11. The method of claim 2 in which a mixture of equimolar quantities of the aluminum chloride and 2,4,5-trichlorobenzene sulphochloride is treated with a wet air stream until about 0.5 to 3% by weight of water based upon the weight of the aluminum-chloride is present and then reacting said mixture with monochlorobenzene at a temperature between about 100° C. and 160° C.

12. The method of claim 2 in which aluminum chloride containing about 1% by weight of ferric chloride is mixed with 2,4,5-trichlorobenzenesulphochloride at a temperature of about 105° C. to 130° C., moist air is passed through the resultant solution until about 1% by weight of water, calculated with respect to the aluminum chloride, has been taken up, this solution and monochlorobenzene are separately heated to a temperature of about 115° C. to 130° C. and at this temperature are supplied separately and continuously to a reactor which is heated to a temperature of about 115° C. to 130° C. at a speed such that the time of treatment in the reactor is from about 10 to 5 minutes, after which the mixture is continuously drawn off from the reactor.

References Cited in the file of this patent

FOREIGN PATENTS 217,763    Switzerland _____ Feb. 16, 1942